3,103,506
PREPARATION OF CELLULOSE VALERATES
Carl J. Malm, Brazelton Fulkerson, and John W. Mench, Rochester, N.Y., assignors to Eastman Kodak Company, Rochester, N.Y., a corporation of New Jersey
No Drawing. Filed May 15, 1962, Ser. No. 194,978
5 Claims. (Cl. 260—225)

This invention relates to the preparation of cellulose valerates having a melting point below 150° C. in which sulfuric acid catalyst is employed to promote the esterification.

In many instances it is of advantage to have a cellulose ester having a melting point below 150° C. but the preparation of cellulose esters of this kind is often difficult because of the difficulty of removing the acid from the product. Cellulose esters having a melting point below 150° C. ordinarily require a substantial content of higher acyl groups, as for example fatty acid radicals of more than 4 carbon atoms. It has been recognized in the prior art that the preparation of esters of this type using an acid catalyst is fraught with difficulty. For instance volume V of "Cellulose and Cellulose Derivatives," by Ott, page 790, points out that the anhydrides of organic acids containing more than 4 carbon atoms cannot be made to readily esterify cellulose by use of acid catalysts and hence these esters require other methods of preparation. Methods which have been used are with (1) acid chlorides and pyridine, (2) alkali cellulose reacting with acid chlorides and (3) the use of chloroacetic anhydride as an impelling agent in esterifying cellulose with higher fatty acid and the like. In one case where sulfuric acid catalyst was used in preparing a higher fatty acid ester of cellulose, degraded cellulose was used as the starting material. The amount of sulfuric acid used exceeded that of the cellulose and 7 days' reaction time was required to obtain the desired product.

One object of our invention is to provide a process for preparing cellulose esters using sulfuric acid catalyst to obtain products having a melting point below 150° C. which esters are capable of being readily freed of residual acid therein. Another object of our invention is to provide a process for making valeric acid esters of cellulose by a practical operation using sulfuric acid catalyst. A further object of our invention is to prepare valeric acid esters of cellulose using a cellulose starting material of good quality. A still further object of our invention is to provide a method of preparing valeric acid esters of cellulose in which the presence of inert organic solvents is unnecessary. A still further object of our invention is to provide a new and useful cellulose ester, namely, cellulose propionate valerate in which at least 75% of the acyl content is valeryl. Other objects of our invention will appear herein.

We have found that valeric acid esters of cellulose in which at least 75% of the acyl is valeryl and which have a melting point below 150° C. may be prepared using a sulfuric acid catalyst, if the cellulose is first subjected to a water activation, is dewatered with fatty acid of 2–4 carbon atoms and is esterified with a bath made up of ½ to 1 part by weight of fatty acid of 2–5 carbon atoms per part of cellulose and a valeric anhydride content of at least 4½ times the amount of the cellulose by weight plus 1–10% of sulfuric acid based on the weight of the cellulose. The amount of valeric anhydride in excess of 4½ times is optional with the individual operator but it is desirable that the valeric anhydride be sufficient to assure good mixing of the liquid with the cellulose in the esterification mixer. The reaction is carried out at an esterification temperature within the range of 70–130° F. The product obtained in accordance with the invention is of such character that the residual acid therein is readily removable such as by treating the product first with aqueous acid and subsequently with water.

In carrying out an esterification in accordance with our invention the cellulose is activated by treatment with water having a swelling action on the cellulose. The cellulose is then dewatered with fatty acid of 2–4 carbon atoms which fatty acid may either be retained by the cellulose or be replaced by valeric acid, being so carried out that the cellulose continues to be wet with liquid. The cellulose should at the end of this treatment be so adjusted that it contains ½ to 1 part of fatty acid by weight per part of cellulose. This cellulose is mixed with at least 4½ parts of valeric anhydride per part of cellulose and 1–10% of sulfuric acid based on the weight of the cellulose and the mixing is continued at 70–130° F. until substantial esterification has occurred. At least 75% of the acyl of the cellulose ester obtained is valeryl. The product is then desirably treated with magnesium salt of lower fatty acid either by adding solid magnesium carbonate to the solution thereof in the esterification mass or by dissolving the magnesium carbonate in fatty acid and adding this solution to the mass. The mass is then cooled, diluted with acetic acid and precipitated into aqueous acetic acid of approximately 30–50% concentration. Residual acid is removed from the precipitated product by a series of washes with aqueous acetic acid of not over 50% concentration. It is convenient to wash the product using aqueous acetic acid in the initial washes and mineral-free water such as distilled water for the final washes.

If a straight cellulose valerate is desired, the cellulose is pretreated by a water treatment such as soaking in water, dewatering with acetic, propionic or butyric acid and then replacing with valeric acid in such manner that the cellulose contains no more than ½ to 1 part of valeric acid per part of cellulose by weight. If the presence of acetyl, propionyl or butyryl is not objectionable (and cellulose propionate valerate is one aspect of our invention) then the cellulose as dewatered and having a propionic or other fatty acid content of no more than ½ to 1 part per part by weight of cellulose may be used directly in the esterification which is carried out with sufficient valeric anhydride that at least 75% of the acyl of the cellulose ester obtained is valeryl. The following examples illustrate our invention:

*Example 1*

250 parts by weight of cotton linters were activated by soaking in distilled water for 16 hours. The linters were centrifuged to remove excess water and were given three changes of propionic acid to remove any remaining water, centrifuging between changes. After the last change the linters contained 185 parts of propionic acid or about 0.74 part per part of linters. The linters were then added to a Werner-Pfleiderer sigma-bladed type mixer, 1125 parts of valeric anhydride containing 9.25 parts of concentrated sulfuric acid were added and the mixer was started. The reaction mass was maintained at approximately 100–102° F. and at the end of 4 hours, 40 minutes a clear, viscous solution was obatined. There was then added 15.3 parts of solid magnesium carbonate and the temperature was raised to 245–250° F. and held for three hours which served to remove the combined sulfuric acid from the cellulose ester, thus stibilizing the product. The mass was then cooled to 65° F. and diluted with an equal volume of glacial acetic acid. The mass diluted to the desired extent was precipitated into an agitated vessel containing 50% acetic acid. The excess liquid was then removed from the precipitated product by draining. The product was then given 20 washes in distilled water for 1 hour continuing draining after each wash. The cellulose propionate valearte obtained was isolated and dried at 120° F. It contained combined therein 8.8% of propionyl and 55.5% of valeryl, had a melting point of 135° C., a char point of 280° C. and an intrinsic viscosity in acetone of 1.34.

*Example 2*

250 parts of cotton linters were soaked in distilled water overnight. The linters were centrifuged and were dewatered with 3 changes of acetic acid centrifuging between each change. The linters were than given 3 changes with valeric acid, centrifuging between changes, to remove the acetic acid. The resulting linters, containing 0.7 part by weight of valeric acid per part (by weight) of linters, were placed in a Werner-Pfleiderer sigma-bladed mixer and a mixture of 1125 parts of valeric anhydride and 9.25 parts of concentrated sulfuric acid (all by weight) was added. The mass was stirred while maintaining at 90° F. for 6 hours and 25 minutes. A clear, viscous solution was obtained. There was then added 15.3 parts of magnesium carbonate in 250 parts of glacial acetic acid and the temperature of the mass was raised to 245° F. and held at that point for 2 hours. The solution was cooled by standing overnight, was diluted with acetic acid and was precipitated into 50% aqueous acetic acid. The product was washed twice in 50% acetic acid and was given 15 washes in distilled water following which it was centrifuged and dried. The product was found to contain 63% of combined valeryl and an intrinsic viscosity in acetone of 0.80, a melting point of 130° C. and a char point of 275° C.

The products obtained in accordance with our invention have very good resistance to moisture, low melting points and good adhesion properties. These cellulose derivatives are of particular interest for use in protective coatings. The low melting point of esters in accordance with our invention are desirable in melt coating and heat sealing applications.

We claim:

1. A process of preparing cellulose derivatives having melting points below 150° C. in which sulfuric acid is employed as the esterification catalyst which comprises atcivating cellulose starting material with water, dewatering with 2–4 carbon atom fatty acid and esterifying the cellulose at 70–130° F. with an esterification bath comprising, per part of cellulose, ½ to 1 part of 2–5 carbon atom fatty acid and at least 4½ parts of valeric anhydride, said bath containing as the esterification catalyst 1–10% of sulfuric acid based on the weight of the cellulose.

2. A process of preparing cellulose derivatives having melting points below 150° C. in which sulfuric acid is employed as the esterification catalyst which comprises activating cellulose starting material with water, dewatering with propionic acid and esterifying the cellulose at 70–130° F. with an esterification bath comprising, per part of cellulose, ½ to 1 part of propionic acid and at least 4½ parts of valeric anhydride, said bath containing as the esterification catalyst 1–10% of sulfuric acid based on the weight of the cellulose.

3. A process of preparing cellulose derivatives having melting points below 150° C. in which sulfuric acid is employed as the esterification catalyst which comprises activating cellulose starting material with water, dewatering with 2–4 carbon atom fatty acid, replacing said fatty acid wtih valeric acid and esterifying the cellulose at 70–130° F. with an esterification bath comprising, per part of cellulose, ½ to 1 part of valeric acid and at least 4½ parts of valeric anhydride, said esterification bath containing 1–10% of sulfuric acid based on the weight of the cellulose.

4. A process of preparing cellulose derivatives having melting points below 150° C. in which sulfuric acid is employed as the esterification catalyst which comprises activating cellulose starting material with water, dewatering with acetic acid, replacing said acetic acid with valeric acid and esterifying the cellulose at 70–130° F. with an esterification bath comprising, per part of cellulose, ½ to 1 part of valeric acid and at least 4½ parts of valeric anhydride, said esterification bath containing 1–10% of sulfuric acid catalyst based on the weight of the cellulose.

5. Cellulose propionate valerate, at least 75% of the combined acyl content of which is valeryl.

References Cited in the file of this patent

UNITED STATES PATENTS

| | | |
|---|---|---|
| 1,668,944 | Clarke et al. | May 8, 1928 |
| 1,698,048 | Clarke et al. | Jan. 8, 1929 |
| 2,032,749 | Haskins | Mar. 3, 1936 |
| 2,139,663 | Bley | Dec. 13, 1938 |
| 2,478,396 | Hinke et al. | Aug. 9, 1949 |